(12) United States Patent
Goto et al.

(10) Patent No.: US 10,972,006 B2
(45) Date of Patent: Apr. 6, 2021

(54) POWER SUPPLY DEVICE AND CONTROL METHOD FOR POWER SUPPLY DEVICE

(71) Applicant: KABUSHIKI KAISHA TOYOTA CHUO KENKYUSHO, Nagakute (JP)

(72) Inventors: Shigeaki Goto, Nagakute (JP); Keisuke Ishikawa, Nagakute (JP); Shuji Tomura, Nagakute (JP); Naoki Yanagizawa, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/343,880

(22) PCT Filed: Oct. 26, 2017

(86) PCT No.: PCT/JP2017/038731
§ 371 (c)(1),
(2) Date: Apr. 22, 2019

(87) PCT Pub. No.: WO2018/079664
PCT Pub. Date: May 3, 2018

(65) Prior Publication Data
US 2019/0267896 A1    Aug. 29, 2019

(30) Foreign Application Priority Data
Oct. 27, 2016  (JP) .............................. JP2016-210653

(51) Int. Cl.
*H02M 3/155*    (2006.01)
*H01M 10/42*    (2006.01)
*H02J 1/10*     (2006.01)

(52) U.S. Cl.
CPC ........... *H02M 3/155* (2013.01); *H01M 10/42* (2013.01); *H01M 10/425* (2013.01);
(Continued)

(58) Field of Classification Search
CPC ....... H02M 3/155–158; H02M 3/1584; H02M 3/1588; H01M 10/42; H01M 10/4207;
(Continued)

(56) References Cited

U.S. PATENT DOCUMENTS 5,563,780 A  * 10/1996  Goad .................... H02J 1/102
                                                363/71
6,265,846 B1 *  7/2001  Flechsig .............. H02J 7/0016
                                                320/116
(Continued)

FOREIGN PATENT DOCUMENTS

JP    H09-509557 A    9/1997
JP    2003-116280 A   4/2003
(Continued)

OTHER PUBLICATIONS

Sep. 3, 2019 Search Report issued in European Patent Application No. 17864990.1.
(Continued)

*Primary Examiner* — Yemane Mehari
(74) *Attorney, Agent, or Firm* — Oliff PLC

(57) ABSTRACT

A power supply device includes battery circuit modules each having a battery, a first switching element S1 connected in parallel to the battery, and a second switching element S2 connected in series to the battery between the battery and the first switching element S1, the second switching element S2 being turned off when the first switching element S1 is turned on, a battery circuit module group in which the battery circuit modules are connected in series, and a control circuit for outputting, at intervals of a certain time, a gate signal for turning on and off the first switching element S1 and the second switching element S2 to the battery circuit modules.

6 Claims, 5 Drawing Sheets

(52) U.S. Cl.
CPC ......... *H01M 10/4207* (2013.01); *H02J 1/102* (2013.01); *H01M 2220/20* (2013.01); *H02J 2207/20* (2020.01)

(58) Field of Classification Search
CPC .... H01M 10/4221; H02J 1/102; H02J 7/0065; H02J 7/0016; H02J 7/0018; Y02E 60/12; G01R 31/3658
USPC ........... 323/71, 271, 272, 280–285; 320/116, 320/118, 119; 324/469
See application file for complete search history.

(56) References Cited

U.S. PATENT DOCUMENTS

| | | | | |
|---|---|---|---|---|
| 7,132,833 | B2* | 11/2006 | Layden | H01M 2/1077 |
| | | | | 324/429 |
| 8,872,384 | B2* | 10/2014 | Stratakos | H03K 17/145 |
| | | | | 307/104 |
| 8,872,474 | B2* | 10/2014 | Scheucher | H01M 10/4207 |
| | | | | 320/112 |
| 9,627,908 | B2* | 4/2017 | Kaminsky | H02J 2207/20 |
| 2003/0067278 | A1 | 4/2003 | Nakamura et al. | |
| 2004/0051534 | A1* | 3/2004 | Kobayashi | B60L 58/22 |
| | | | | 324/429 |
| 2009/0167242 | A1* | 7/2009 | Naganuma | H02J 7/0025 |
| | | | | 320/118 |
| 2009/0251100 | A1* | 10/2009 | Incledon | H02J 7/0016 |
| | | | | 320/106 |
| 2014/0021923 | A1* | 1/2014 | Uchida | H02J 7/0016 |
| | | | | 320/118 |
| 2014/0146586 | A1 | 5/2014 | Das et al. | |
| 2015/0115736 | A1 | 4/2015 | Snyder | |
| 2016/0233762 | A1 | 8/2016 | Mathew et al. | |
| 2018/0099579 | A1* | 4/2018 | Hale | G05F 1/462 |
| 2018/0241243 | A1* | 8/2018 | Zhu | H02M 1/44 |

FOREIGN PATENT DOCUMENTS

| | | |
|---|---|---|
| JP | 2009-159726 A | 7/2009 |
| JP | 2013-38959 A | 2/2013 |
| JP | 2014-23361 A | 2/2014 |

OTHER PUBLICATIONS

Nov. 28, 2017 International Search Report issued in International Patent Application PCT/JP2017/038731.
Nov. 28, 2017 Written Opinion issued in International Patent Application No. PCT/JP2017/038731.
Dec. 4, 2018 Office Action issued in Japanese Patent Application No. 2016-210653.
Jul. 24, 2018 Office Action issued in Japanese Patent Application No. 2016-210653.
Daniel Montesinos-Miracle et al.; "Design and Control of a Modular Multilevel DC/DC Converter for Regenerative Applications"; IEEE Transactions on Power Electronics; vol. 28; No. 8; Aug. 2013; pp. 3970-3979.

* cited by examiner

[Fig. 1]
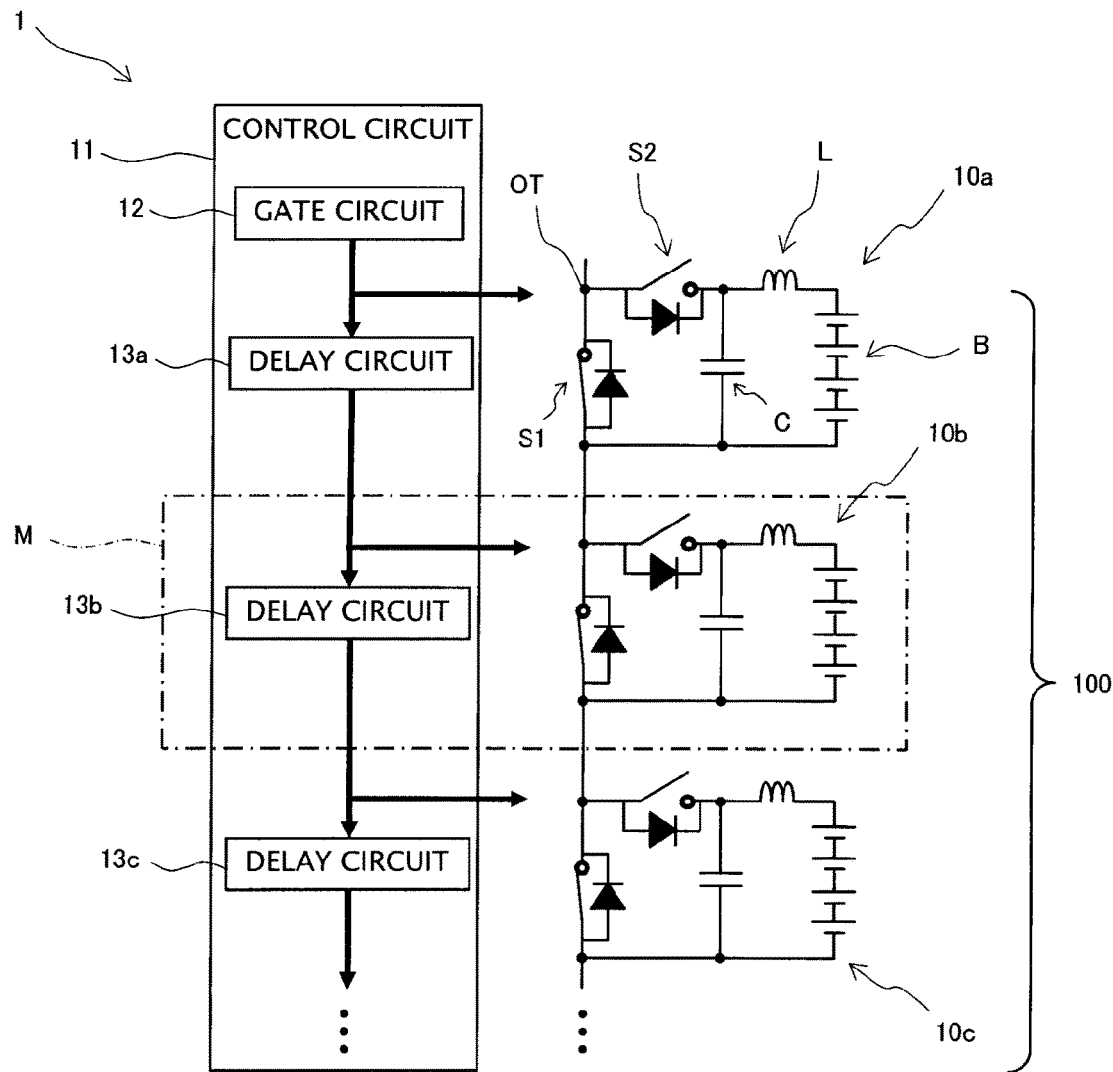
[Fig. 2]
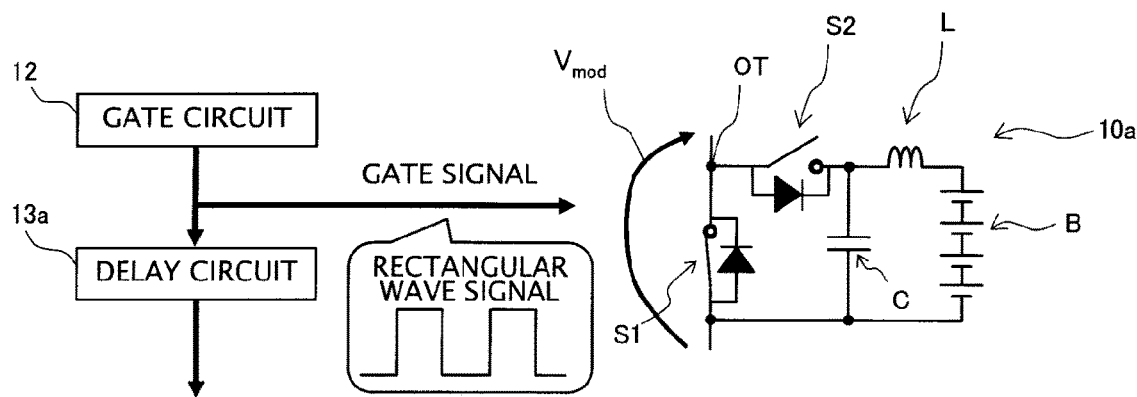

[Fig. 3]
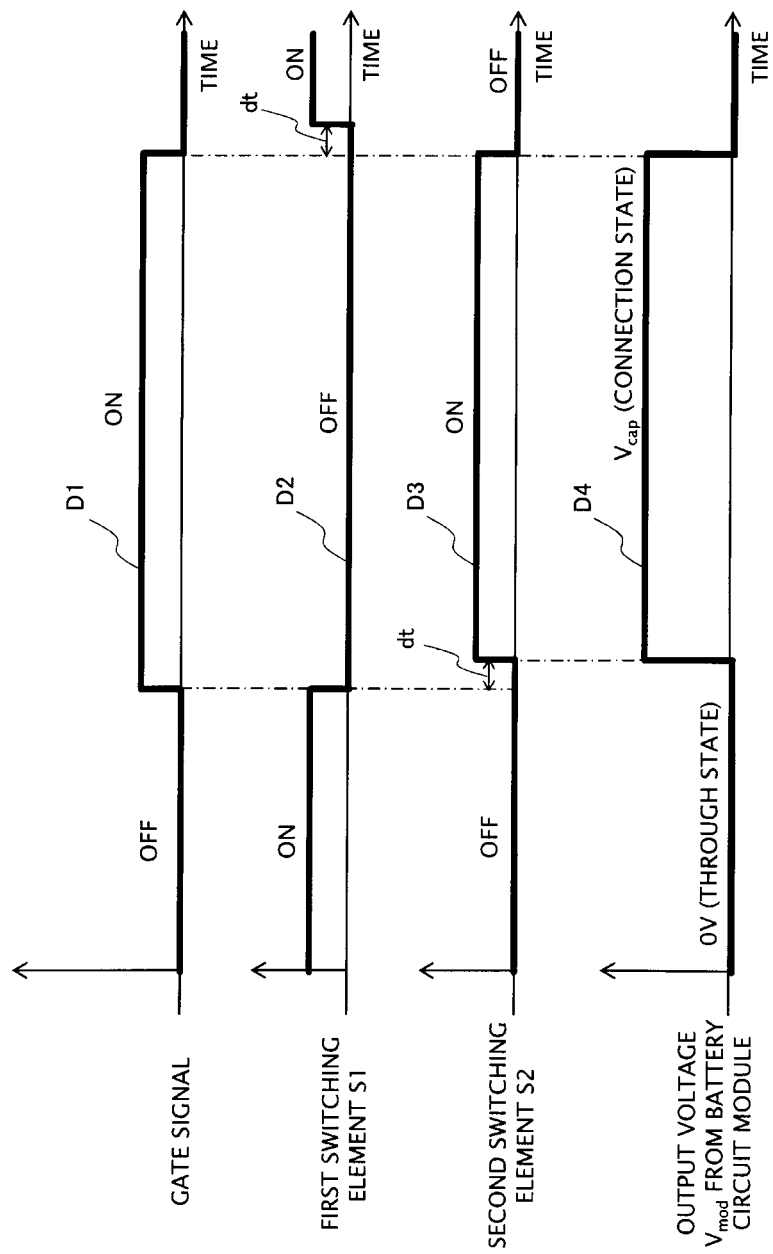

[Fig. 4A]
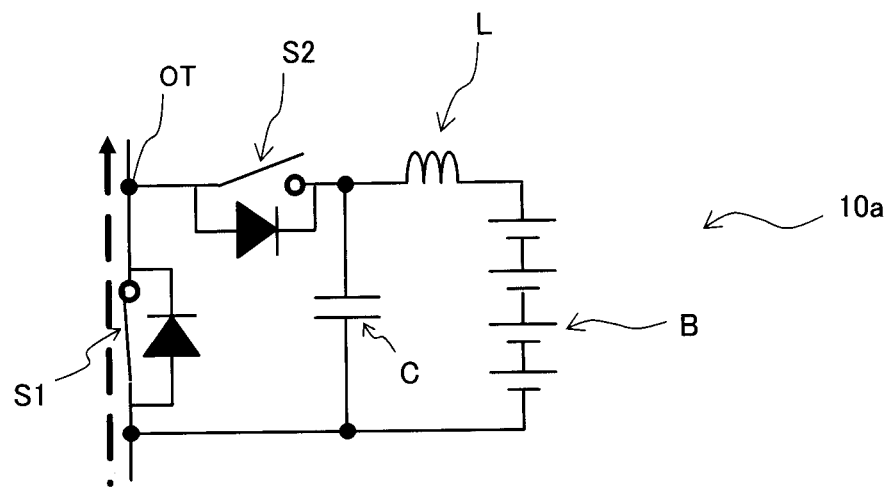
[Fig. 4B]
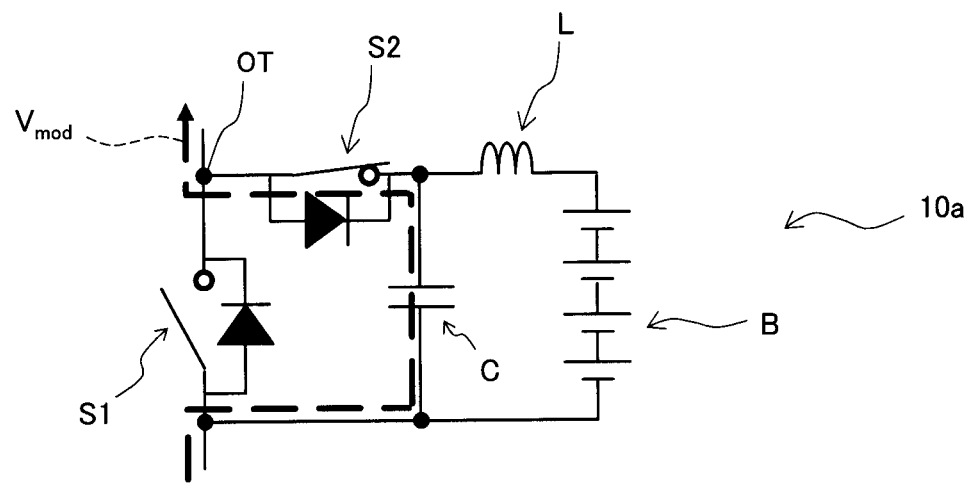

[Fig. 5]
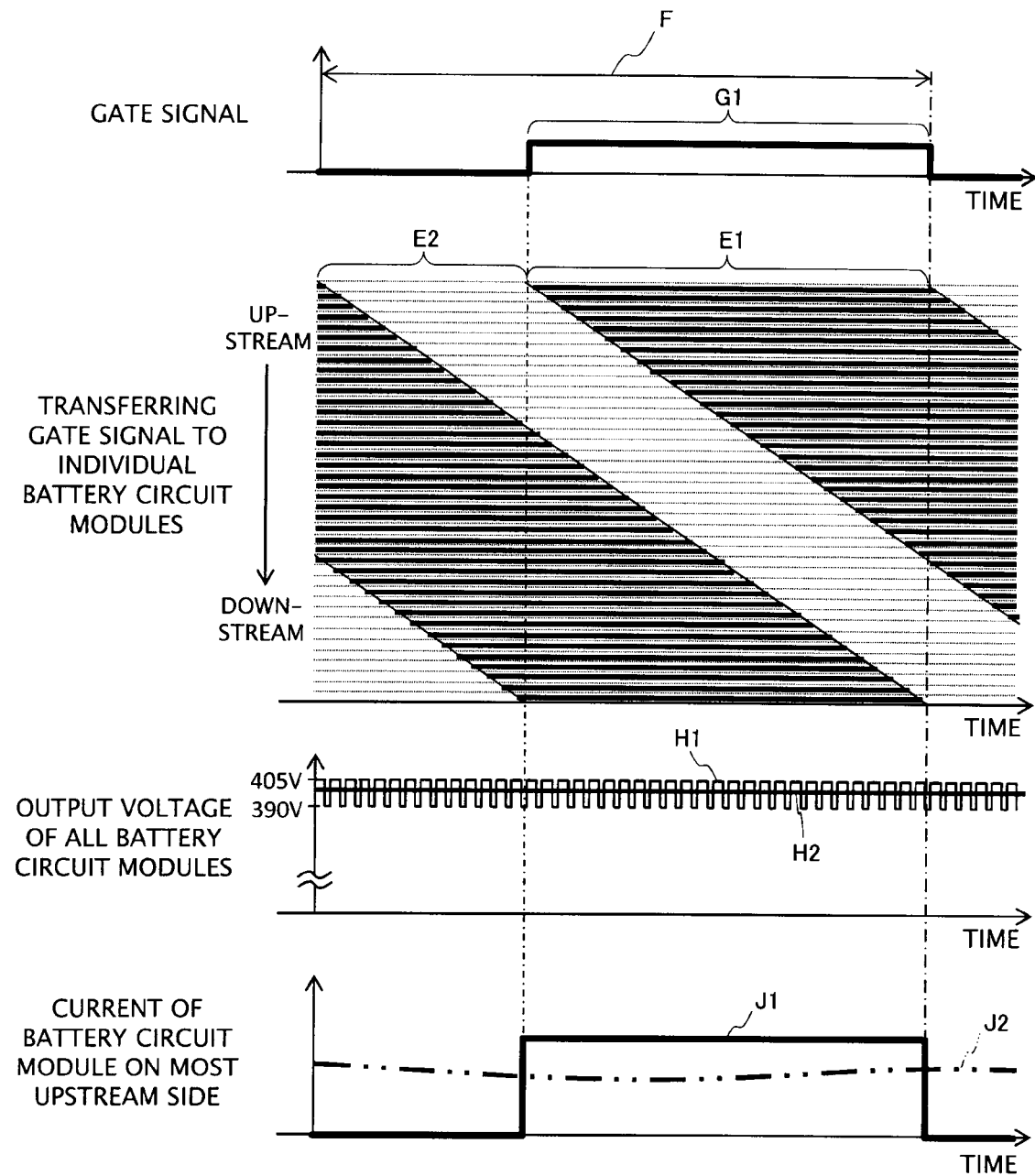

[Fig. 6]
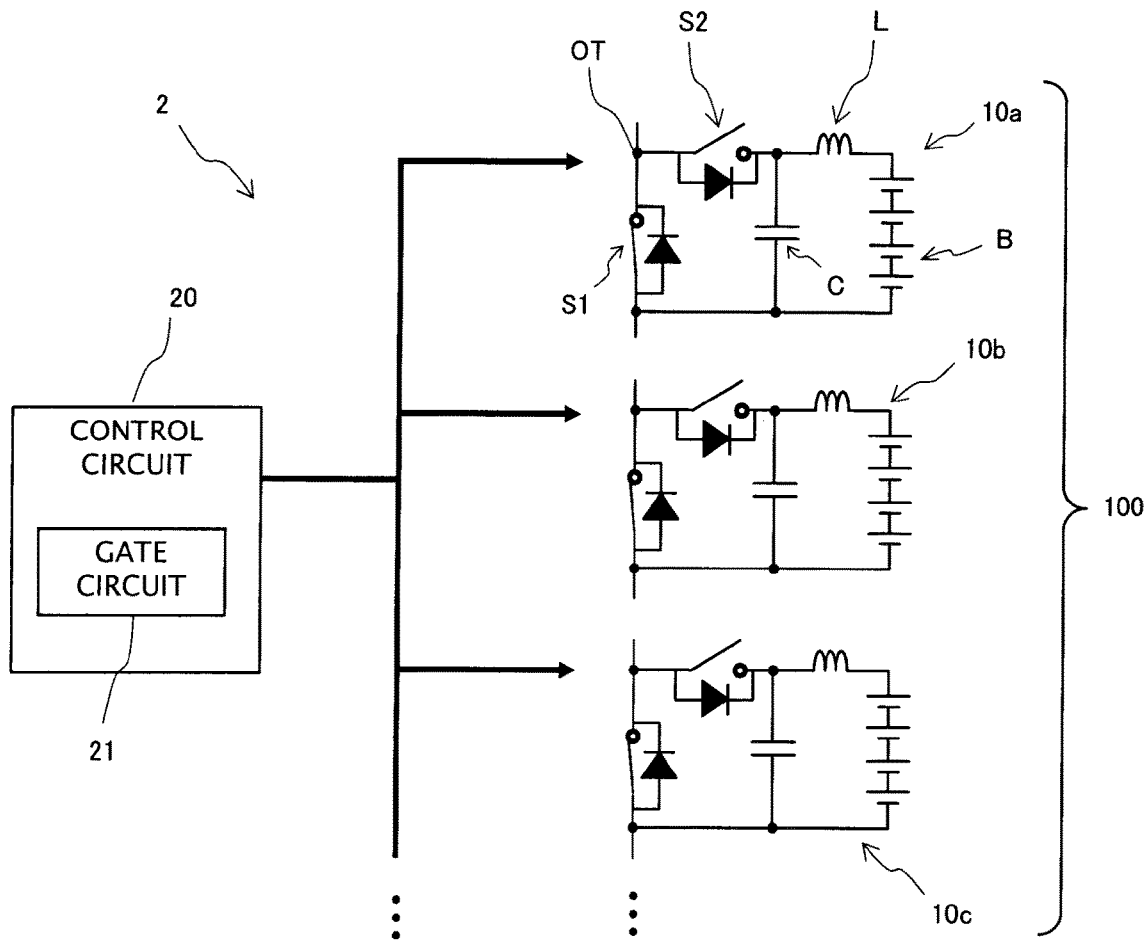
[Fig. 7]
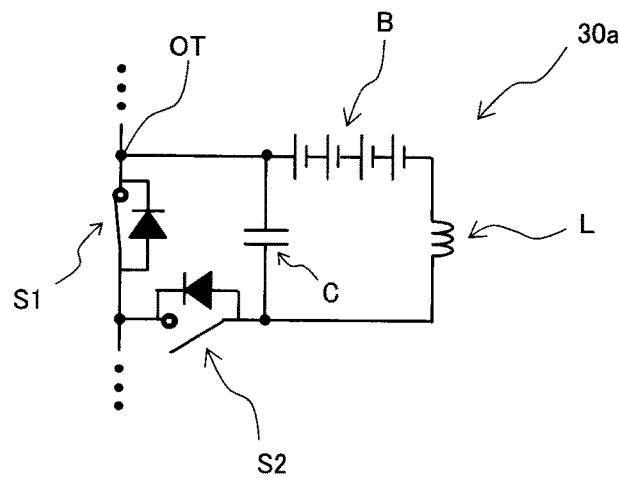

__US 10,972,006 B2__

POWER SUPPLY DEVICE AND CONTROL METHOD FOR POWER SUPPLY DEVICE

TECHNICAL FIELD

A power supply device having a plurality of battery circuit modules and to a control method for a power supply device.

BACKGROUND ART

Various kinds of power supply devices are known and, for example, a power supply device used to drive the driving motor of a hybrid vehicle or electric vehicle raises the voltage of the battery using a step-up converter and inputs the raised voltage to an inverter.

In particular, a power supply device is published including a DC-DC converter that DC-DC converts a DC voltage from cells such as a battery using the switching of a switching element and outputs the converted voltage to a running motor; frequency setting means that sets the switching frequency of the switching element based on the loss characteristics of the DC-DC converter; and control means that performs the switching control of the switching element based on the set frequency. In the power supply device, the DC-DC converter can be driven efficiently by setting the switching frequency that reduces the loss of the DC-DC converter.

SUMMARY

Technical Problem

In the power supply device, the switching element and a step-up reactor used in a DC-DC converter are designed according to the necessary current capacity and output voltage. In addition, the cabinet in which they are housed is designed according to the sizes of components used. Accordingly, the switching element, step-up reactor, and peripheral components related to them need to be designed according to the necessary current capacity and output voltage.

That is, since the power supply device needs to be designed newly every time the requested specifications (necessary current capacity and output voltage are changed), the versatility is low. In addition, a DC-DC converter for raising voltage is necessary.

An object is to provide a power supply device having a simple structure and capable of easy designing to a desired output voltage.

Solution to Problem

A power supply device includes a battery circuit module including a battery, an output terminal through which a voltage of the battery is output, a first switching element connected to the output terminal and connected in parallel to the battery, and a second switching element connected in series to the battery between the battery and the first switching element, the second switching element being turned off when the first switching element is turned on, a battery circuit module group in which a plurality of the battery circuit modules are connected in series via the output terminal, and a control circuit in which a gate signal for turning on and off the first switching element and the second switching element of the battery circuit module is output to the battery circuit modules in the battery circuit module group at intervals of a certain time.

In addition, the control circuit has delay circuits provided so as to correspond to the plurality of battery circuit modules, the delay circuits delaying the gate signal by a certain time and transferring the delayed signal between adjacent battery circuit modules in the battery circuit module group.

In addition, when one of the battery circuit modules becomes defective, the control circuit excludes the defective battery circuit module and inputs the gate signal to the normal battery circuit module that is not defective. In addition, the control circuit turns on the first switching element and turns off the second switching element in the battery circuit module to which the gate signal has not been input. In addition, the control circuit adjusts the certain time to a larger value or a smaller value.

In addition, in a control method for a power supply device, the power supply device includes a battery circuit module including a battery, an output terminal through which a voltage of the battery is output, a first switching element connected to the output terminal and connected in parallel to the battery, and a second switching element connected in series to the battery between the battery and the first switching element, the second switching element being turned off when the first switching element is turned on, and a battery circuit module group in which a plurality of the battery circuit modules are connected in series via the output terminal, in which a gate signal for turning on and off the first switching element and the second switching element of the battery circuit module is output to the battery circuit modules in the battery circuit module group at intervals of a certain time.

Advantageous Effects of Invention

It is possible to obtain a power supply device having a simple structure and capable of easy designing to a desired output voltage; that is, having high versatility.

BRIEF DESCRIPTION OF DRAWINGS

FIG. 1 a block diagram schematically illustrating a power supply device according to a first embodiment.

FIG. 2 is a structural diagram schematically illustrating the battery circuit module.

FIG. 3 is a time chart illustrating the operation of the battery circuit module.

FIG. 4A is an explanatory diagram illustrating the operation of the battery circuit module in the state in which the first switching element is turned on and the second switching element is turned off.

FIG. 4B is an explanatory diagram illustrating the operation of the battery circuit module in the state in which the first switching element is turned off and the second switching element is turned on.

FIG. 5 is a time chart illustrating the operation of the entire power supply device.

FIG. 6 is a block diagram schematically illustrating a power supply device according to a second embodiment.

FIG. 7 is a structural diagram schematically illustrating a modification of the battery circuit module.

DESCRIPTION OF EMBODIMENTS

A power supply device 1 according to a first embodiment will be described. FIG. 1 is a block diagram illustrating the power supply device 1. As illustrated in FIG. 1, the power supply device 1 includes a plurality of battery circuit modules 10a, 10b, and 10c, . . . and a control circuit 11 that turns on and off the battery circuit modules 10a, 10b, and 10c, . . . by outputting a gate signal to the battery circuit modules 10a, 10b, and 10c, . . . .

The battery circuit modules 10a, 10b, and 10c, . . . are connected in series to configure a battery circuit module group 100. Since the battery circuit modules 10a, 10b, and 10c, . . . have the same structure, the structure and the driving of the battery circuit module 10a will be described. It should be noted that details on the control circuit 11 and the control of the power supply device 1 by the control circuit 11 will be described later.

The battery circuit module 10a includes a battery B in which a plurality of battery cells are connected in series, an output terminal OT through which the voltage of the battery B is output, a first switching element S1 connected to the output terminal OT and connected in parallel to the battery B, a second switching element S2 connected in series to the battery B between the battery B and the first switching element S1, a choke coil L provided between the battery B and the second switching element S2, and a capacitor C connected in parallel to the battery B.

The first switching element S1 and the second switching element S2 are MOS-FETs, which are field-effect transistors. The first switching element S1 and the second switching element S2 perform switching operation by receiving the gate signal from the control circuit 11. It should be noted that switching elements other than MOS-FETs may be used, so long as they can perform switching operation.

In addition, since a secondary battery is used as the battery B here, to suppress degradation of the battery B due to increase in an internal resistance loss, the battery B, the choke coil L, and the capacitor C constitute an RLC filter for leveling a current.

Next, the operation of the battery circuit module 10a will be described with reference to FIGS. 2 and 3. FIG. 2 schematically illustrates the operation of the battery circuit module 10a and FIG. 3 illustrates the time chart of the operation of the battery circuit module 10a. In addition, in FIG. 3, symbol D1 represents a rectangular wave of a gate signal for driving the battery circuit module 10a, symbol D2 represents a rectangular wave indicating the ON-OFF state of the first switching element S1, symbol D3 represents a rectangular wave indicating the ON-OFF state of the second switching element S2, and symbol D4 represents the characteristic of a voltage $V_{mod}$ output by the battery circuit module 10a.

In the initial state (that is, the state in which the gate signal is not output) of the battery circuit module 10a, the first switching element S1 is in the ON state and the second switching element S2 is in the OFF state. When the gate signal is input to the battery circuit module 10a from the control circuit 11, the battery circuit module 10a performs switching operation by PWM control. This switching operation is performed by alternately turning on and off the first switching element S1 and the second switching element S2.

As indicated by symbol D1 in FIG. 3, when the gate signal is output from the control circuit 11, the first switching element S1 and the second switching element S2 of the battery circuit module 10a are driven according to the gate signal. The first switching element S1 switches from the ON state to the OFF state at the leading edge of the gate signal. In addition, the first switching element S1 switches from the OFF state to the ON state slightly after (dead time dt) the trailing edge of the gate signal (see symbol D2).

In contrast, the second switching element S2 switches from the OFF state to the ON state slightly after (dead time dt) the leading edge of the gate signal. In addition, the second switching element S2 switches from the ON state to the OFF state concurrently with the trailing edge of the gate signal (see symbol D3). As described above, the first switching element S1 and the second switching element S2 are turned on and off alternately.

The reason why the first switching element S1 operates slightly after (dead time dt) the trailing edge of the gate signal and the second switching element S2 operates slightly after (dead time dt) the leading edge of the gate signal is to prevent the first switching element S1 and the second switching element S2 from operating at the same time. That is, this prevents a short circuit when the first switching element S1 and the second switching element S2 are turned on at the same time. The dead time dt for delaying the operation is set to, for example, 100 ns, but it may be set to an appropriate value. It should be noted that a current flows back via the diode during the dead time dt to achieve the state in which the switching element in parallel to the diode is turned on.

This operation separates the capacitor C from the output terminal OT of the battery circuit module 10a, and the voltage is not output to the output terminal OT when the gate signal is off (that is, the first switching element S1 is on and the second switching element S2 is off) as illustrated by symbol D4 in FIG. 3 in the battery circuit module 10a. This state is illustrated in FIG. 4(a). As illustrated in FIG. 4(a), the battery B (capacitor C) of the battery circuit module 10a is bypassed (through state).

In addition, when the gate signal is on (that is, the first switching element S1 is off and the second switching element S2 is on), the capacitor C is connected to the output terminal OT of the battery circuit module 10a and the voltage is output to the output terminal OT. This state is illustrated in FIG. 4(b). As illustrated in FIG. 4(b), the voltage $V_{mod}$ is output to the output terminal OT via the capacitor C in the battery circuit module 10a.

Returning to FIG. 1, the control of the power supply device 1 by the control circuit 11 will be described. The control circuit 11 controls the entire battery circuit module group 100. That is, the control circuit 11 controls the operation of the battery circuit modules 10a, 10b, and 10c, . . . and controls the output voltage of the power supply device 1.

The control circuit 11 includes a gate circuit 12 that outputs the rectangular wave gate signal and delay circuits 13a, 13b, and 13c, . . . that delay the gate signal output from the gate circuit 12 and output the delayed gate signal to the battery circuit modules 10a, 10b, and 10c, . . . sequentially.

The gate circuit 12 is connected to the battery circuit module 10a on the most upstream side among the battery circuit modules 10a, 10b, and 10c, . . . connected in series in the battery circuit module group 100.

The delay circuits 13a, 13b, and 13c, . . . are provided so as to correspond to the battery circuit modules 10a, 10b, and 10c, . . . . The delay circuit 13a delays the gate signal from the gate circuit 12 by a certain time, outputs the delayed gate signal to the adjacent battery circuit module 10b, and outputs the delayed gate signal to the delay circuit 13b. As a result, the gate signal output from the gate circuit 12 is delayed and transferred to the battery circuit modules 10a, 10b, and 10c, . . . sequentially.

Although the delay circuits 13a, 13b, and 13c, . . . are included in the control circuit 11 as the structure of the electrical circuit, the delay circuits 13a, 13b, and 13c, . . . are preferably configured integrally with the battery circuit modules 10a, 10b, and 10c, . . . as the hardware structure. In FIG. 1, as illustrated by, for example, the dashed line M, the delay circuit 13b and the battery circuit module 10b are configured integrally (as a module).

When the gate signal is output from the gate circuit 12 to the battery circuit module 10a on the most upstream side in FIG. 1, the battery circuit module 10a is driven and, as illustrated in FIGS. 4(a) and 4(b), the voltage of the battery circuit module 10a is output to the output terminal OT. In addition, the gate signal from the gate circuit 12 is input to the delay circuit 13a and the gate signal delayed by a certain time is input to the battery circuit module 10b adjacent to the battery circuit module 10a. This gate signal drives the battery circuit module 10b.

In contrast, the gate signal from the delay circuit 13a is also input to the delay circuit 13b and the gate signal delayed by a certain time is input to the battery circuit module 10c adjacent to the battery circuit module 10b, as in the delay circuit 13a. Similarly, the gate signal is delayed and input to the battery circuit module on the downstream side sequentially. The battery circuit modules 10a, 10b, and 10c, ... are driven sequentially and the voltages of the battery circuit modules 10a, 10b, and 10c, ... are output to the output terminals OT sequentially.

FIG. 5 illustrates the state in which the battery circuit modules 10a, 10b, and 10c, ... are driven sequentially. As illustrated in FIG. 5, according to the gate signal, the battery circuit modules 10a, 10b, and 10c, ... are driven sequentially from the upstream side to the downstream side with a certain delay time. In FIG. 5, symbol E1 illustrates the state (connected state) in which the first switching elements S1 of the battery circuit modules 10a, 10b, and 10c, ... are off and the second switching elements S2 are on, and the battery circuit modules 10a, 10b, and 10c, ... output the voltages from the output terminals OT. In addition, symbol E2 illustrates the state (through state) in which the first switching elements S1 of the battery circuit modules 10a, 10b, and 10c, ... are on, the second switching elements S2 are off, and the battery circuit modules 10a, 10b, and 10c, ... do not output the voltages from the output terminals OT. As described above, the battery circuit modules 10a, 10b, and 10c, ... are driven sequentially with a certain delay time.

The gate signal and the setting of the delay time of the gate signal will be described with reference to FIG. 5. The cycle F of the gate signal is set by calculating the sum of the delay times of the battery circuit modules 10a, 10b, and 10c, .... Accordingly, when the delay time is set to a large value, the frequency of the gate signal becomes low. In contrast, the delay time is set to a small value, the frequency of the gate signal becomes high. In addition, the delay time of the gate signal can be set appropriately according to the specification requested for the power supply device 1.

The ON time ratio G1 (that is, the ratio of the ON time to the cycle F) at the cycle F of the gate signal can be calculated by dividing the output voltage of the power supply device 1 by the total voltage (obtained by multiplying the battery circuit module battery voltage by the number of battery circuit modules) of the battery circuit modules 10a, 10b, and 10c, .... That is, the ON time ratio G1 is calculated by dividing the power supply device output voltage by (battery circuit module battery voltage*the number of battery circuit modules). Strictly speaking, since the ON time ratio G1 deviates by the dead time dt, the ON time ratio is corrected by feedforward or feedback as generally performed in a chopper circuit.

The total voltage of the battery circuit modules 10a, 10b, and 10c, ... can be calculated by multiplying the battery circuit module battery voltage by the number of battery circuit modules in the connected state, as described above.

If the output voltage of the power supply device 1 is a value divisible by the battery voltage of the one battery circuit module 10a, at the moment when the battery circuit module 10a switches from pass (through state) to connection, the other battery circuit modules switch from connection to pass (through state). Therefore, the output voltage of the entire battery circuit module group 100 does not fluctuate.

However, If the output voltage of the power supply device 1 is a value not divisible by the battery voltage of the one battery circuit module 10a, the output voltage of the power supply device 1 does not match the total voltage of the battery circuit modules 10a, 10b, and 10c, .... In other words, the output voltage (the output voltage of the entire battery circuit module group 100) of the power supply device 1 fluctuates. However, the amplitude of fluctuations at this time is the voltage for one battery circuit module, and the fluctuation cycle is equal to the cycle F of the gate signal divided by the number of battery circuit modules. Since tens of battery circuit modules are connected in series in this example, the parasitic inductance of all battery circuit modules is large and the fluctuations in the voltage are filtered, consequently generating the stable output voltage of the power supply device 1.

Next, a specific example will be described. It is assumed that, for example, the desired output voltage of the power supply device 1 is 400 V, the battery voltage of the battery circuit module 10a is 15 V, the number of battery circuit modules 10a, 10b, and 10c, ... is 40, and the delay time is 200 ns in FIG. 5. In this case, the output voltage (400V) of the power supply device 1 is not divisible by the battery voltage (15 V) of the battery circuit module 10a.

Since the cycle F of the gate signal is calculated by multiplying the delay time by the number of battery circuit modules based on these values, the cycle F is 200 ns*40=8 μs and the gate signal is a rectangular wave having a frequency equivalent to 125 kHz. In addition, since the ON time ratio G1 of the gate signal is calculated by dividing the power supply device output voltage by (battery circuit module battery voltage*the number of battery circuit modules), the ON time ratio G1 is 400 V divided by (15 V*40) @ 0.67.

When the battery circuit modules 10a, 10b, and 10c, ... are driven sequentially based on these values, the output characteristics of rectangular waves indicated by symbol H1 in FIG. 5 are obtained at the power supply device 1. The voltage output characteristics fluctuate between 390 V and 405 V. That is, the output characteristics fluctuate at the cycle calculated by the cycle F of the gate signal divided by the number of battery circuit modules and fluctuate at 8 μs/40=200 ns (equivalent to 5 MHz). The fluctuations are filtered by the parasitic inductance of the wiring of the battery circuit modules 10a, 10b, and 10c, and the power supply device 1 has an output voltage of 400 V as indicated by symbol H2.

Since a current flows through the capacitor C in the battery circuit module 10a on the most upstream side in the case of the connected state, the current waveform of the capacitor is a rectangular wave as illustrated by symbol J1 in FIG. 5. Since the battery B and the capacitor C form an RLC filter, the current having been filtered and leveled is output from the battery B (see symbol J2 in FIG. 5).

As described above, the current waveforms of all of the battery circuit modules 10a, 10b, and 10c, ... are the same, and all of the battery circuit modules 10a, 10b, and 10c, ... can output currents evenly.

As described above, when the battery circuit module group 100 is driven, the gate signal having been output to the battery circuit module 10a on the most upstream side is delayed by a certain time and the delayed gate signal is output to the battery circuit module 10b on the next downstream side, and the gate signal is delayed by a certain time and the delayed gate signal is output to the battery circuit modules on the next downstream side sequentially. Accordingly, the battery circuit modules 10a, 10b, and 10c, . . . sequentially output the voltages delayed by a certain time. The sum of the voltages is calculated, the voltage of the power supply device 1 is output, and the desired voltage can be obtained. Accordingly, a step-up circuit is not necessary and the structure of the power supply device 1 can be simplified, thereby achieving small size and low cost. In addition, since the structure is simplified, the electrical losses are reduced and the power conversion efficiency is improved. In addition, since the plurality of the battery circuit modules 10a, 10b, and 10c, . . . output voltages substantially evenly, electrical energy consumption does not concentrate on a particular battery circuit module, thereby enabling reduction in an internal resistance loss of the power supply device 1.

In addition, it is possible to output a desired voltage by adjusting the ON time ratio G1, thereby improving the versatility of the power supply device 1. In particular, even when one of the battery circuit modules 10a, 10b, and 10c, . . . becomes defective and the battery circuit module becomes unavailable, a desired voltage can be obtained by excluding the defective battery circuit module and resetting the cycle F, the ON time ratio G1, and the delay time of the gate signal using the normal battery circuit modules. That is, even if one of the battery circuit modules 10a, 10b, and 10c, . . . becomes defective, a desired voltage can be continuously output.

In addition, since the frequency of the gate signal becomes lower by setting the delay time of the gate signal to a larger value, the switching frequencies of the first switching element S1 and the second switching element S2 also become lower, the switching loss can be reduced, and the electric power conversion efficiency can be improved. In contrast, since the frequency of the gate signal becomes higher by setting the delay time of the gate signal to a smaller value, the frequency of voltage fluctuations becomes higher, filtering is easier, and a stable voltage can be obtained. In addition, voltage fluctuations can be easily leveled by the RLC filter. As described above, it is possible to provide the power supply device 1 having requested specifications and performance by adjusting the delay time of the gate signal.

Next, the second embodiment will be described with reference to FIG. 6. As illustrated in FIG. 6, a power supply device 2 includes the battery circuit modules 10a, 10b, and 10c, . . . and the battery circuit module group 100 according to the first embodiment. A control circuit 20 for controlling the driving of the battery circuit modules 10a, 10b, and 10c, . . . is connected to the battery circuit module group 100. That is, the control circuit 20 is connected to all of the battery circuit modules 10a, 10b, and 10c, . . . .

The control circuit 20 has a gate circuit 21 for outputting the gate signal driving the battery circuit modules 10a, 10b, and 10c, . . . and individually outputs the gate signal from the gate circuit 21 to the battery circuit modules 10a, 10b, and 10c, . . . . In addition, the control circuit 20 outputs the gate signal to the battery circuit modules 10a, 10b, and 10c, . . . at intervals of a certain time. That is, the control circuit 20 sequentially drives, in arbitrary order, at intervals of a certain time, the battery circuit modules 10a, 10b, and 10c, . . . regardless of the disposition of the battery circuit modules 10a, 10b, and 10c, . . . by outputting the gate signal. For example, the control circuit 20 first drives the battery circuit module 10c by outputting the gate signal to the battery circuit module 10c and, after a certain time, drives the battery circuit module 10a by outputting the gate signal to the battery circuit module 10a. In this way, the battery circuit modules 10c, 10a, . . . are driven sequentially.

Therefore, since the power supply device 2 according to the second embodiment does not have the delay circuits 13a, 13b, and 13c, . . . of the power supply device 1 according to the first embodiment, the structure can be simplified accordingly and the cost can be reduced.

Next, a modification of the structure of the battery circuit module 10a will be described. As illustrated in FIG. 7, as the structure of a battery circuit module 30a, the dispositions (connection positions) of the choke coil L and the battery B may be exchanged in the battery circuit module 10a illustrated in FIG. 1. In addition, the second switching element S2 may be disposed oppositely to the output terminal OT with respect to the first switching element S1. That is, if the voltage of the battery B (capacitor C) can be output to the output terminal OT by the switching operation of the first switching element S1 and the second switching element S2, the dispositions of elements and electric components in the battery circuit module 30a can be changed as appropriate.

In addition, when the voltage output characteristics of the battery B are good (that is no problem occurs in the battery even if the battery current waveform becomes a rectangular wave), the RLC filter may be omitted. In addition, although the parasitic inductance of the wiring of the battery circuit modules 10a, 10b, and 10c, . . . is used, an inductance component for obtaining a necessary inductance value may be mounted instead of using the parasitic inductance of the wiring.

In addition, although in the first embodiment the gate signal from the gate circuit 12 is output to the battery circuit module 10a before being output to the delay circuit 13a, the gate signal may be output to the battery circuit module 10a after being delayed by the delay circuit 13a in FIG. 1. In this case, the delayed gate signal output from the delay circuit 13a is output to the battery circuit module 10a and the delay circuit 13b. The same control is performed also in the delay circuits 13b, 13c, . . . . This control can also drive the battery circuit modules 10a, 10b, and 10c, . . . sequentially while adding delay by a certain time.

REFERENCE SIGNS LIST 1, 2 Power supply device
10a, 10b, 10c, 30a Battery circuit module
11, 20 Control circuit
12, 21 Gate circuit
13a, 13b, 13c Delay circuit
100 Battery circuit module group
B Battery
C Capacitor
L Choke coil
OT Output terminal
S1 First switching element
S2 Second switching element

The invention claimed is:

1. A power supply device comprising: a battery circuit module, including: a battery; a first output terminal and a second output terminal through which a voltage of the battery is output; a first switching element connected between the first output terminal and the second output terminal and connected in parallel to the, battery and a capacitor; the capacitor connected in parallel with the battery; and a second switching element connected in series to the battery and the capacitor and connected between the capacitor and the first output terminal, the second switching element being turned off when the first switching element is turned on, the second switching element being not connected between the battery and the capacitor; battery circuit module group in which a plurality of the battery circuit modules are connected in series via their first output terminal and second output terminal; and a control circuit configured to: output, at intervals of a certain time, a gate signal that turns on and off the first switching element and the second switching element of each battery circuit module to the battery circuit modules in the battery circuit module group; and when one of the battery circuit modules becomes defective, exclude the defective battery circuit module and input the gate signal to a normal battery circuit module that is not defective.

2. The power supply device according to claim 1, wherein the control circuit has delay circuits provided so as to correspond to the plurality of battery circuit modules, the delay circuits delaying the gate signal by a certain time and transferring the delayed signal between adjacent battery circuit modules in the battery circuit module group.

3. The power supply device according to claim 1, wherein the control circuit turns on the first switching element and turns off the second switching element in the battery circuit module to which the gate signal has not been input.

4. The power supply device according to claim 1, wherein the control circuit adjusts the certain time to a larger value or a smaller value.

5. The power supply device according to claim 1, further comprising:
an inductor connected between the capacitor and the battery.

6. A control method for a power supply device, the power supply device comprising: a battery circuit module including a battery, a first output terminal and a second output terminal through which a voltage of the battery is output, a first switching element connected between the first output terminal and the second output terminal and connected in parallel to the battery and a capacitor, the capacitor connected in parallel with the battery, and a second switching element connected in series to the battery and the capacitor and connected between the capacitor and the first output terminal, the second switching element being not connected between the battery and the; and a battery circuit module group in which a plurality of the battery circuit modules are connected in series via their first output terminal and second output terminal, the method comprising using a control circuit to: output a gate signal that turns on and off the first switching element and the second switching element of each battery circuit module to the battery circuit modules in the battery circuit module group at intervals of a certain time; turn off the second switching element whenever the first switching element is turned on; and when one of the battery circuit modules becomes defective, exclude the defective battery circuit module and input the gate signal to a normal battery circuit module that is not defective.

* * * * *